(12) United States Patent
Knuth et al.

(10) Patent No.: US 11,254,103 B2
(45) Date of Patent: Feb. 22, 2022

(54) BULLET-RESISTENT INSULATING GLAZING UNIT

(71) Applicant: Cardinal LG Company, Eden Prairie, MN (US)

(72) Inventors: Eric Knuth, Amery, WI (US); Michael Wothe, Amery, WI (US)

(73) Assignee: Cardinal LG Company, Eden Prairie, MN (US)

( * ) Notice: Subject to any disclaimer, the term of this patent is extended or adjusted under 35 U.S.C. 154(b) by 0 days.

(21) Appl. No.: 16/851,736

(22) Filed: Apr. 17, 2020

(65) Prior Publication Data

US 2020/0331237 A1    Oct. 22, 2020

Related U.S. Application Data

(60) Provisional application No. 62/836,463, filed on Apr. 19, 2019.

(51) Int. Cl.
*B32B 17/10* (2006.01)
*B32B 27/30* (2006.01)
*B32B 27/32* (2006.01)

(52) U.S. Cl.
CPC .. *B32B 17/10055* (2013.01); *B32B 17/10091* (2013.01); *B32B 17/10761* (2013.01);
(Continued)

(58) Field of Classification Search
CPC .. E06B 3/66314; E06B 3/6612; E06B 3/6715; E06B 5/10; F41H 5/0407;
(Continued)

(56) References Cited

U.S. PATENT DOCUMENTS 3,864,204 A    2/1975  Shorr et al.
3,930,452 A    1/1976  Van Laethem et al.
(Continued)

FOREIGN PATENT DOCUMENTS

CA    3032373 A1    2/2018
DE    2542441 A1    3/1977
(Continued)

OTHER PUBLICATIONS

Machine translation of applicant DE 2542441. (Year: 1977).*
(Continued)

*Primary Examiner* — Donald J Loney
(74) *Attorney, Agent, or Firm* — Fredrikson & Byron, P.A.

(57) ABSTRACT

An insulating glazing unit may be configured to provide both visible transparency and bullet-resistance. The bullet resistant properties of the unit may be achieved through the combination and coordination of different materials forming the panes of the unit. For example, the insulating glazing unit may include multiple laminate panes separated by a spacer. Each laminate pane may include at least two transparent rigid substrates joined by a layer of laminate material. The laminate material used in one laminate pane may be different than the laminate material used in another pane. For example, one pane may utilize a laminate material that is soft and flexible. This may help absorb and dissipate the impact of a projectile. By contrast, another laminate pane may utilize a laminate material that is stiff and rigid. This may help provide a final stopping force to a projectile.

27 Claims, 2 Drawing Sheets

(52) U.S. Cl.
CPC ............. *B32B 27/30* (2013.01); *B32B 27/32* (2013.01); *B32B 2307/412* (2013.01); *B32B 2307/558* (2013.01); *B32B 2315/08* (2013.01); *B32B 2323/00* (2013.01); *B32B 2323/04* (2013.01); *B32B 2329/06* (2013.01); *B32B 2419/00* (2013.01)

(58) Field of Classification Search
CPC ........ B32B 17/10743; B32B 17/10055; B32B 17/10174; B32B 17/10091; B32B 17/10761; B32B 2571/02
See application file for complete search history.

(56) References Cited

U.S. PATENT DOCUMENTS

| | | |
|---|---|---|
| 4,130,684 A | 12/1978 | Littell, Jr. et al. |
| 4,243,719 A | 1/1981 | Holmes |
| 4,312,903 A | 1/1982 | Molari, Jr. |
| 4,595,624 A | 6/1986 | Greathead |
| 4,663,228 A | 5/1987 | Bolton et al. |
| 4,668,574 A | 5/1987 | Bolton et al. |
| 5,154,953 A * | 10/1992 | de Moncuit ...... B32B 17/10678 428/34 |
| 5,496,643 A | 3/1996 | Von Alpen |
| 5,567,529 A | 10/1996 | Smith |
| 5,763,062 A | 6/1998 | Smith et al. |
| 6,333,085 B1 | 12/2001 | Emek |
| 6,630,235 B2 | 10/2003 | Oshima et al. |
| 6,708,595 B1 | 3/2004 | Chaussade et al. |
| 6,818,268 B2 | 11/2004 | Gonzalez |
| 7,174,692 B1 | 2/2007 | Vickers et al. |
| 8,789,343 B2 | 7/2014 | Zurn et al. |
| 2019/0283554 A1 | 9/2019 | Reinecke |

FOREIGN PATENT DOCUMENTS

| | | |
|---|---|---|
| DE | 102016204082 A1 | 9/2017 |
| DE | 202018105920 U1 | 11/2018 |
| EP | 0109566 A2 | 5/1984 |
| EP | 2110238 A1 | 10/2009 |

OTHER PUBLICATIONS

International Patent Application No. PCT/US2020/028720, International Search Report and Written Opinion dated Jul. 16, 2020, 18 pages.

* cited by examiner

FIG. 1

BULLET-RESISTANT INSULATING GLAZING UNIT

RELATED MATTERS

This application claims the benefit of U.S. Application No. 62/836,463, filed Apr. 19, 2019, the entire contents of which are incorporated herein by reference.

TECHNICAL FIELD

This disclosure relates to insulating glazing units and, more particularly, to insulating glazing units that are resistant to impact from projectiles such as bullets.

BACKGROUND

Insulating glass units, such as double pane and triple pane insulating glass units, are commonly used in windows and doors. The insulating glass units generally have a series of transparent panes separated by gas spaces. For example, a double pane insulating glass unit may have two glass panes separated by a gas space. In order to hold the glass panes apart to provide the gas space, a spacer may be inserted between the two glass panes. The spacer may both hold the glass panes apart from one another and also hermetically seal the gas space created between the panes. The hermetically sealed gas space can be filled with an insulating gas or evacuated to create a vacuum environment, reducing thermal transfer across the gas space and, ultimately, the entire insulating glass unit.

Traditional insulating glass units can be penetrated by high velocity projectiles, such as a bullet or a piece of ground debris accelerated during a severe weather event such as a thunderstorm, hurricane, or tornado. As a result, an insulating glass unit may be perceived as a penetration weak spot within the structure of a building. Building designers are increasingly looking for design solutions that can provide enhanced penetration protection without meaningfully altering the visual appearance of the structure compared to a traditional design.

For example, in the United States, there were 250 designated active shooter incidents that occurred between 2000 and 2017, resulting in over 2200 casualties. Of these 250 shooter incidents, approximately 42% occurred at commercial business locations, approximately 21% occurred at educational facilities, and approximately 10% occurred at government facilities. Structures that can provide enhanced penetration protection to high impact projectiles, such as bullets, can provide a passive design solution to help counteract changing security and building integrity demands.

SUMMARY

In general, this disclosure is directed to insulating glazing units that provide enhanced penetration projection to high impact and/or high velocity debris contract, such as bullet strikes, compared to traditional insulating glazing units. In some examples, the insulating glazing unit is composed of multiple laminate panes joined together by a spacer. Each laminate pane may be formed of two or more transparent substrates joined together by a laminate material. The laminate pane on one side of the spacer may have a different configuration than the laminate pane on the opposite side of the spacer. For example, the laminate pane on one side of the spacer may be composed of substrates of different thickness(es) than the substrates forming the laminate pane on the opposite side of the spacer. As another example, the laminate pane on one side of the spacer may include a laminate layer that is formed of a different laminate material than the laminate layer on the opposite side of the spacer.

In one implementation, the insulating glazing unit includes a first laminate pane and a second laminate pane separated by a spacer. The first laminate pane may be positioned facing the environment from which a contacting projectile is expected to emerge. Accordingly, in the event that the projectile does contact the insulating glazing unit in the expected strike direction, the projectile may contact the first laminate pane before contacting the second laminate pane. In either case, the first laminate pane may be formed of a plurality of transparent, comparatively rigid substrates joined by one or more laminate layers. At least one transparent, rigid substrate may have a different thickness than at least one other transparent, rigid substrate. The laminate layer joining the substrates may have a thickness different than (e.g., less than) the thicknesses of all the transparent, rigid substrates in the laminate pane.

In this example, the second laminate pane may also be formed of a plurality of transparent, rigid substrates joined by one or more laminate layers. The laminate material used to form the laminate layer for the second laminate pane may be different than the laminate material used to form the first laminate pane. In some examples, the laminate layer(s) in the first laminate pane are formed of a material that is comparatively soft and flexible. This can help absorb and dissipate the impact of a striking projectile. By contrast, the laminate layer(s) in the second laminate pane may be formed of a material that is comparatively stiff and rigid. This can help provide a final stopping force to a projectile whose energy has already been dissipated through the first laminate pane.

In one example, a bullet-resistant insulated glazing structure is described that includes a first laminate pane, a second laminate pane, and a spacer. The first laminate pane includes a first rigid substrate, a second rigid substrate, a third rigid substrate, a first laminate layer bonding the first rigid substrate to the second rigid substrate, and a second laminate layer bonding the second rigid substrate to the third rigid substrate. The second laminate pane includes a fourth rigid substrate, a fifth rigid substrate, and a third laminate layer bonding the fourth rigid substrate to the fifth rigid substrate. The spacer is positioned between the first pane of transparent material and the second pane of transparent material to define a between-pane space. The spacer seals the between-pane space from gas exchange with a surrounding environment and holds the first laminate pane a separation distance from the second laminate pane. The example specifies that the first laminate layer and the second laminate layer are formed of a first laminate material whereas the third laminate layer is formed of a second laminate material different than the first laminate material. The example further states that at least one of the first rigid substrate, the second rigid substrate, and the third rigid substrate has a thickness that is greater than at least one other of first rigid substrate, the second rigid substrate, and the third rigid substrate.

The details of one or more examples are set forth in the accompanying drawings and the description below. Other features, objects, and advantages will be apparent from the description and drawings, and from the claims.

DETAILED DESCRIPTION

In general, an insulating glazing unit may provide an optically transparent thermally insulating structure that can be mounted in the wall of a building. In different examples, the insulating glazing unit may be fabricated from two panes of material, which may be referred to as a double pane insulating glazing unit, three panes of material, which may be referred to as a triple pane insulating glazing unit, or even four or more panes of material. Each pane of material in the insulating glazing unit may be separated from an opposing pane of material by a between-pane space, which may be filled with an insulating gas or evacuated to create a vacuum.

Because an insulating glazing unit includes multiple panes of material, each pane of material forming the unit may provide penetration protection in the event the insulating glazing unit is struck by a projectile. In the event of a projectile strike, the first pane may absorb the initial impact of the strike. If the force of the projectile is greater than the stopping force provided by the first pane, the projectile may breach the first pane and pass through the between-pane space to contact the second pane. Accordingly, the second pane of the insulating glazing unit may provide a second opportunity for the unit to stop the projectile. Only if the force of the incoming projectile is greater than the stopping force of all the panes of the insulating glazing unit will the projectile breach the insulating glazing unit. If such a breach occurs, the force of the projectile breaching the insulating glazing unit is hopefully diminished to a point where the projectile is not harmful to individuals positioned behind the insulating glazing unit.

In some examples described in greater detail in this disclosure, an insulating glazing unit is described that includes at least a first laminate pane and a second laminate pane separated by a spacer. Each laminate pane is formed of multiple layers of different materials. For example, each laminate pane may be formed of multiple layers of transparent material, such as glass, joined together by one or more laminating layers. For example, the first laminate pane may have three or more rigid layers joined together by two or more laminate layers. The layers of the first laminate pane (e.g., thicknesses, materials) may be selected to provide an initial impact barrier to an incoming projectile. For instance, by configuring the first laminate pane with multiple layers of different thicknesses, an incoming bullet may expand as it contacts the different layers of the laminate pane. This can cause the energy of the bullet to be dissipated across and/or through the laminate pane, helping to stop the bullet from breaching the pane.

In some configurations, the second laminate pane may have two or more rigid layers joined together by one or more laminate layers. The second laminate pane may provide a few different functions within the insulating glazing unit. First, in the event that the first laminate pane stops the incoming projectile, the rigid layers of the first laminate pane may nevertheless fracture and throw debris (e.g., broken glass) back against the second laminate pane. The second laminate pane can stop this debris. Second, in the event that the projectile breaches the first laminate (dissipating at least some of its energy in the process of breaching the pane), the second laminate pane may provide a secondary barrier for stopping the projectile. In this regard, the force characteristics of the projectile may change as it passes through the insulating glazing unit. For example, the projectile may breach the first laminate pane but be stopped by the second laminate pane, causing the projectile to drop in the between-pane space between the two laminate panes.

For instance, an incoming projectile may strike the first pane at a high velocity and with a high force. Accordingly, the first laminate pane may be structured to absorb a substantial amount (e.g., a majority) of the energy of the incoming projectile. To do this, the first laminate pane may, in some configurations, be configured to provide some give or elasticity. This can help the first laminate pane absorb the energy of the incoming projectile rather than have the projectile pass directly through the pane with minimal energy loss, which may occur if the first laminate pane is too rigid and cannot absorb the energy of the projectile during the limited period of contact between the pane and projectile. After having passed through the first laminate pane, the projectile may be moving at a slower velocity and carry less energy than when the projectile struck the first laminate pane. Accordingly, the second laminate pane may have a different structure and function than the first laminate pane. The second laminate pane may be structured to provide a final stopping barrier for the projectile rather than an absorbing barrier as provided by the first laminate pane. To do this, the second laminate pane may, in some configurations, be configured as a comparatively rigid pane that does not have the elasticity or flexibility of the first pane.

Figure 1:
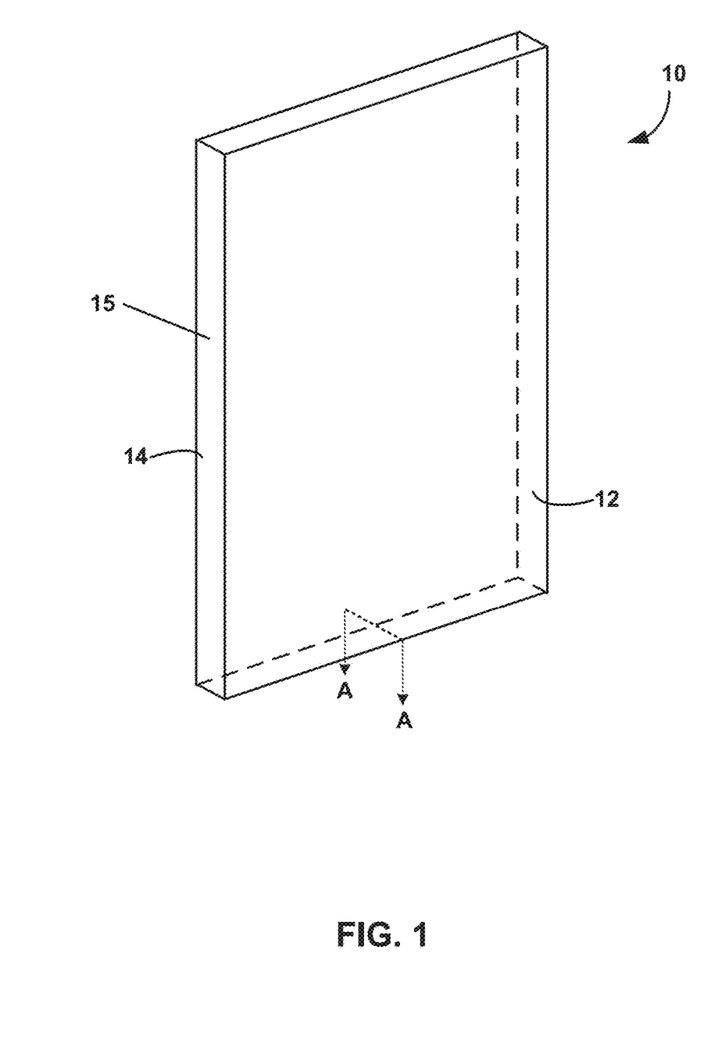
FIG. 1 is a perspective drawing of an example bullet-resistant insulating glazing unit.

FIG. 1 is a perspective drawing of an example insulating glazing unit 10 that may provide an optically transparent and thermally insulating bullet-resistant structure. Insulating glazing unit 10 can be structured to resist penetration by projectiles, such as bullets. Insulating glazing unit 10 defines a front surface 12 and a back surface 14. As described in greater detail below, insulating glazing unit 10 includes at least two substrates separated by a spacer to define at least one between-pane space. The substrates may be held apart from one another by a spacer that extends about a common perimeter 15 of the substrates and that hermetically seals the between-pane space created between the two substrates.

Figure 2:
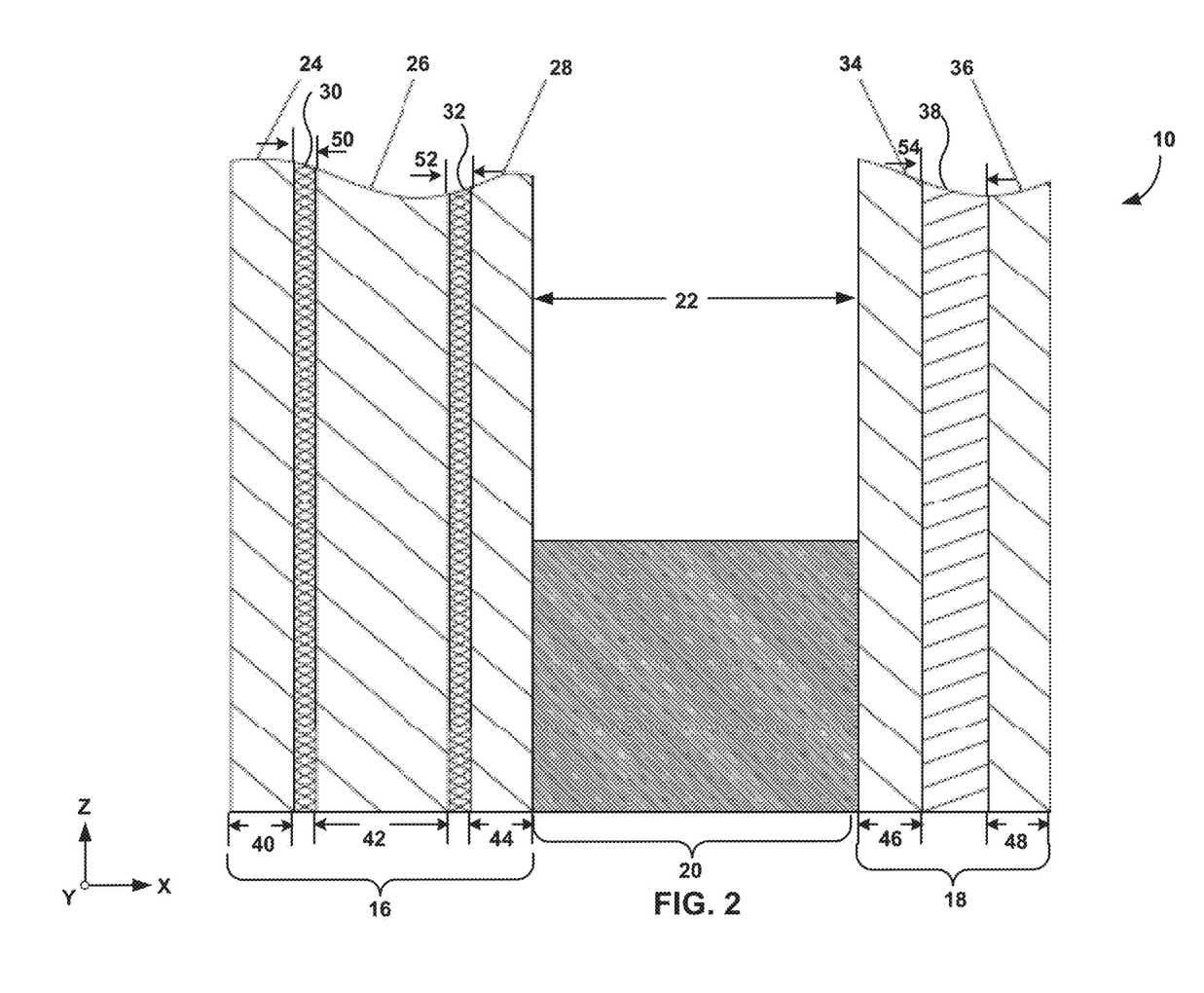
FIG. 2 is side view of the example bullet-resistant insulating glazing unit from FIG. 1 taken along the A-A line indicated on FIG. 1.

FIG. 2 is a cross-sectional view of an edge of insulating glazing unit 10 taken along the A-A cross-sectional line indicated on FIG. 1. In this example, insulating glazing unit 10 includes a first laminate pane 16 and a second laminate pane 18. The first laminate pane 16 is spaced apart from the second laminate pane 18 by a spacer 20 to define a between-pane space 22. Spacer 20 may extend around the entire perimeter 15 (FIG. 1) of insulating glazing unit 10 to hermetically seal between-pane space 22 from gas exchange with a surrounding environment. In some examples, between-pane space 22 is filled with an insulating gas. In other examples, between-pane space 22 is evacuated so that the between-pane space is at vacuum pressure relative to the pressure of an environment surrounding insulating glazing unit 10. Filling the between-pane space 22 with an insulating gas and/or evacuating the between-pane space can reduce thermal transfer across insulating glazing unit 10 as compared to when the between-pane space is filled with atmospheric air at atmospheric pressure.

As described in greater detail below, first laminate pane 16 may have a different design than second laminate pane 18. For example, first laminate pane 16 may have a different number, size, and/or configuration of layers forming the pane than second laminate pane 18. In some implementations, first laminate pane 16 of insulating glazing unit 10 is intended to face an exterior environment (e.g., one exposed to sun and/or precipitation such as rain) while second laminate pane 18 is intended to face an interior environment.

In the example of FIG. 2, first laminate pane 16 includes a first substrate 24, a second substrate 26, and a third substrate 28. First laminate pane 16 also includes a first laminate layer 30 and a second laminate layer 32. The first laminate layer 30 bonds the first substrate 24 to the second substrate 26. The second laminate layer 32 bonds the second substrate 26 to the third substrate 28. Although FIG. 2 illustrates first laminate pane 16 as including three substrates joined by two laminate layers, in other implementations, the laminate pane may have fewer substrates (e.g., a single substrate, two substrates) or more substrates (e.g., four or more substrates) and may have fewer laminate layers (e.g., one laminate layer or no laminate layers) or more laminate layers (e.g., three or more laminate layers).

Second laminate pane 18 in the example of FIG. 2 is illustrated as including two substrates, which may be designated as fourth substrate 34 and fifth substrate 36 to continue with the sequential numbering started with first laminate pane 16. Second laminate pane 18 in the illustrated example also includes at least one laminate layer 38, which may be designated as third laminate layer 38 again continuing with the sequential numbering started with first laminate pane 16. Third laminate layer 38 bonds fourth substrate 34 to fifth substrate 36. In other configurations, second laminate pane 18 may have fewer substrates (e.g., a single substrate) or more substrates (e.g., three or more substrates) and may have fewer laminate layers (e.g., no laminate layers) or more laminate layers (e.g., two or more laminate layers).

Each substrate within each laminate pane may be formed from the same material, or at least one substrate may be formed of a material different than another substrate within the laminate pane. In some examples, at least one (and optionally all) the substrates within a laminate pane (e.g., first laminate pane 16 and second laminate pane 18) are formed of glass. In other examples, at least one (and optionally all) the substrates within a laminate pane (e.g., first laminate pane 16 and second laminate pane 18) are formed of plastic such as, e.g., a fluorocarbon plastic, polypropylene, polyethylene, or polyester. In still other examples, at least one (and optionally all) the substrates within a laminate pane (e.g., first laminate pane 16 and/or second laminate pane 18) are formed from multiple different types of materials, such as glass and a polymeric material.

When installed, insulating glazing unit 10 is generally designed to allow light to pass from one side of the unit through to another side of the unit, e.g., for illuminating a space, and/or allow a user positioned to one side of the unit to observe activity occurring on another side of the unit. For these and other reasons, first laminate pane 16 and second laminate pane 18 are generally constructed of a material that is optically transparent to certain wavelengths of light. In some examples, first laminate pane 16 and second laminate pane 18 are constructed of a material that is transparent to light within the visible spectrum. For example, the individual layers forming first laminate pane 16 and/or second laminate pane 18 may be constructed of clear plastic or clear glass. Such materials may be referred to as visibly transparent materials. In other examples, one or more layers forming first laminate pane 16 and/or second laminate pane 18 may be constructed of materials that are not transparent such as translucent materials or even opaque materials, which may or may not block light transmission through the panes.

In one example, at least one (and optionally all) the substrates of insulating glazing unit 10 are constructed of glass. In various examples, the glass may be aluminum borosilicate glass, sodium-lime (e.g., sodium-lime-silicate) glass, or another type of glass. In addition, the glass may be clear or the glass may be colored, depending on the application. Although the glass can be manufactured using different techniques, in some examples the glass is manufactured on a float bath line in which molten glass is deposited on a bath of molten tin to shape and solidify the glass. Such an example glass may be referred to as float glass.

In examples in which at least one (and optionally all) the substrates of first laminate pane 16 and/or second laminate pane 18 are constructed of glass, the glass may or may not be thermally-strengthened glass. Thermally-strengthened glass is generally stronger than glass that is not thermally-strengthened. Accordingly, using one or more substrates formed of thermally-strengthened glass may help impart projectile resistance to insulating glazing unit 10.

An example of a thermally-strengthened glass is tempered glass. Tempered glass is generally fabricated by heating the glass until the glass reaches a stress-relief point temperature (which may be referred to as the annealing temperature) and thereafter rapidly cooling the glass to induce compressive stresses in the surface of the glass. Tempered glass may exhibit a surface compression of greater than 10,000 pounds per square inch (psi), as determined in accordance with ASTM C1048-04. Another example of a thermally-strengthened glass is Heat Strengthened glass, which may exhibit a strength between tempered glass and annealed glass. Annealed glass is generally fabricated by heating the glass until the glass reaches a stress-relief point temperature (which may also be referred to as the annealing temperature) and thereafter slowly cooling the glass to relieve internal stresses. In some examples, Heat Strengthened glass exhibits a surface compression of approximately 5,000 psi, as determined in accordance with ASTM C1048-04.

Independent of the specific materials used to form the substrates from which first laminate pane 16 and second laminate pane 18 are constructed, the substrates can have a variety of different sizes and shapes. In some applications, such as some window and door applications, the substrates forming first laminate pane 16 and second laminate pane 18 (e.g., first substrate 24, second substrate 26, third substrate 28, fourth substrate 34, and fifth substrate 36) each define a planar substrate that is rectangular or square in shape. For example, each substrate may define a planar substrate that is rectangular or square in shape and has a major dimension (e.g., width or length) greater than 0.5 meters (m) such as, e.g., greater than 1 m, greater than 2 m, or between 0.5 m and 2 m. In general, the substrates forming first laminate pane 16 and second laminate pane 18 may define any suitable size and shape, and the disclosure is not limited to the example of an insulating glazing unit that has rectangular or square panes of any particular size.

In general, the thicknesses of the individual layers forming first laminate pane 16 and second laminate pane 18 and/or the material used for the individual layers of each pane may be selected to impart penetration resistance to insulating glazing unit 10 according to the present disclosure. For example, the thicknesses of the individual layers of one or both laminate panes may be varied to provide asymmetrically thick layers. Configuring one or both laminate panes with asymmetrically thick layers may help attenuate and/or dissipate the force of an incoming projectile in the event of a projectile strike.

In the example of FIG. 2, the first substrate 24 of first laminate pane 16 defines a first substrate thickness 40 (i.e., in the X-direction indicated on FIG. 2), second substrate 26 defines a second substrate thickness 42, and third substrate 28 defines a third substrate thickness 44. Further, in this example, fourth substrate 34 of second laminate pane 18 defines a fourth substrate thickness 46, and fifth substrate 36 defines a fifth substrate weakness 48. The substrates of first laminate pane 16 and second laminate pane 18 may define any suitable thicknesses, and the thicknesses of the substrates may vary, e.g., depending penetration resistance characteristics desired of the substrates and the intended application of the insulating glazing unit 10.

In some examples, first laminate pane 16 includes at least one substrate that is thicker than at least one other substrate of the pane. This can configure the first laminate pane 16 with a thickness asymmetry, e.g., to help absorb and/or dissipate the force of an incoming projectile. For example, when configured with three substrates, second substrate 26 may be thicker than the thickness of first substrate 24 and third substrate 28. In other words, second substrate thickness 42 may be greater than first substrate thickness 40 and third substrate thickness 44. First substrate thickness 40 may be the same as or different than the third substrate thickness 44.

Without wishing to be bound by any particular theory, it has been found in some configurations that positioning a thicker substrate between two comparatively thinner substrates can help attenuate the force of an incoming projectile better than other thickness arrangements. That being said, in other configurations in which first laminate pane 16 includes at least one substrate thicker than at least one other substrate, the thicker substrate may be any one of first substrate 24, second substrate 26, and third substrate 28 (in instances in which first laminate pane 16 includes 3 substrates).

In some configurations, second substrate thickness 42 is at least 1.25 times greater than both first substrate thickness 40 and third substrate thickness 44, such as at least 1.5 times greater, at least 2 times greater, or at least 3 times greater than first substrate thickness 40 and third substrate thickness 44. For example, second substrate thickness 42 may range from 1.5 times thicker to 5 times thicker than first substrate thickness 40 and third substrate thickness 44, such as from 2 times thicker to 4 times thicker than the thickness of each other substrate in laminate pane.

Independent of the relative thicknesses of the substrates in first laminate pane 16, where the laminate pane includes at least one substrate that is thicker than at least one other substrate, the thicker substrate may have a thickness greater than 2.5 mm, such as greater than 3 mm, greater than 3.5 mm, greater than 4 mm, greater than 4.5 mm, or greater than 5 mm. When second substrate 26 is the thicker substrate, second substrate thickness 42 may range from 3 mm to 6.5 mm, such as from 4 mm to 5.5 mm, or from 4.5 mm to 5 mm. Additionally or alternatively, the thinner substrate may have a thickness less than 3.5 mm, such as a thickness less than 3 mm, or a thickness less than 2.5 mm. When first substrate 24 and third substrate 28 are comparatively thinner than second substrate 26, first substrate thickness 40 and third substrate thickness 44 may range from 1.5 mm to 3.5 mm, such as from 2 mm to 3 mm, or from 2 mm to 2.5 mm. Again, first substrate thickness 40 may be the same as or different than third substrate thickness 44. Accordingly, in one implementation, first substrate thickness 40 is the same as third substrate thickness 44 while second substrate thickness 42 is greater. In another implementation, first substrate thickness 40 is different (e.g., greater or less than) third substrate thickness 44, both of which are different than second substrate thickness 42.

With further reference to FIG. 2, fourth substrate 34 defines fourth substrate thickness 46 and fifth substrate 36 defines fifth substrate thickness 48. Fourth substrate thickness 46 may be the same as or different than the substrate thickness 48. For example, in the illustrated configuration, fourth substrate thickness 46 is illustrated as being the same thickness as fifth substrate thickness 48. When fourth substrate 34 and fifth substrate 36 have the same thicknesses, the thickness of the two substrates may or may not be selected based on the thickness of one or more substrates of first laminate pane 16. For example, fourth substrate thickness 46 and/or fifth substrate thickness 48 may be selected to be equivalent to a thinner substrate thickness of first laminate pane 16 or a thicker substrate thickness of first laminate pane 16. In one implementation, fourth substrate thickness 46 and fifth substrate thickness 48 are selected to be the same thicknesses as first substrate thickness 40 and the third substrate thickness 44. As a result, four substrates of insulating glazing unit 10 may have the same thickness while second substrate 26 exhibits a different thickness. Selecting the thicknesses of the substrates of second laminate pane 18 based on the thicknesses of the substrates and first laminate pane 16 (or vice versa) may be useful to provide a coordinated impact and energy absorption arrangement between first laminate pane 16 and second laminate pane 18.

In various examples, fourth substrate thickness 46 and fifth substrate thickness 48 may range from 1.5 mm to 5.5 mm, such as from 2 mm to 5 mm, 2 mm to 4 mm, or 2 mm to 3 mm. For example fourth substrate thickness 46 and fifth substrate thickness 48 may have a thickness falling within a range from 2 mm to 2.5 mm in some configurations.

In some examples, first laminate pane 16 may include a laminate layer formed of a different laminate material than a laminate material used in the laminate layer of second laminate pane 18. The use of different laminate materials in the different panes of insulating glazing unit 10 may provide a coordinated force absorption arrangement for stopping a projectile striking the glazing unit. For example, one laminate layer may be formed of a comparatively soft and flexible laminate material, which may help absorb the energy of the incoming projectile. Another laminate layer may be formed of a comparatively stiff and rigid material, which may help provide a final stopping barrier to the projectile whose energy was dissipated through the laminate pane containing the comparatively soft and flexible laminate material.

In FIG. 2, first laminate pane 16 includes at least one laminate layer which is illustrated as being implemented using two laminate layers: first laminate layer 30 and second laminate layer 32. First laminate layer 30 and second laminate layer 32 may typically be formed of the same laminate material although, in other examples, may be formed of different laminate materials. By contrast, third laminate layer 38 may typically be formed of a different laminate material than both first laminate layer 30 and second laminate layer 32.

As noted, the material used to form the third laminate layer 38 (which may be referred to as a second laminate material when first and second laminate layers 30, 32 are formed from a same first laminate material) may be stiffer than the material used to form first laminate layer 30 and second laminate layer 32. The stiffness of the laminate material used to form each laminate layer (which may also be considered the stiffness of the laminate layer itself) may be characterized according to ASTM D4065-12, which is a standard for characterizing the dynamic mechanical properties of plastics. The testing may be formed at a temperature of 20° C. for the testing duration time of 1 minute. First laminate layer 30 and second laminate layer 32 (and the first laminate material used to form both layers) may exhibit a shear modulus according to ASTM D4065 under the aforementioned conditions of less than 10 mega Pascals (MPa), such as less than 8 MPa, or less than 5 MPa. By contrast, third laminate layer 38 (and the second laminate material used to form the layer) may exhibit a shear modulus according to ASTM D4065 under the aforementioned conditions of greater than 50 MPa, such as greater than 100 MPa, greater than 150 MPa, or greater than 250 MPa.

Example materials that may be used as the first laminate material for first laminate layer 30 and second laminate layer 32 include polyolefin polymers, such as polyvinyl butyral (PVB) and/or ethylene vinyl acetate (EVA).

In some examples, the second laminate material used to form a third laminate layer 38 is an ionoplast (ionomer-based) material. In general, an ionomer material may be an extrudable resin comprising ionically cross-linked ethylene or alpha olefin-carboxylic acid copolymers and mixtures thereof. For example, the ionically cross-linked copolymers may be prepared from a combination of ethylene, styrene, and/or propylene monomers and acrylic acid, methacrylic acid, and/or maleic anhydride monomers. Specific examples of cross-linked copolymers include sodium and/or zinc cross-linked ethylene or alpha olefin-carboxylic acid copolymers, e.g., methacrylic or acrylic acid, copolymers.

Properties which distinguish ionomer resins from other polyolefin heat-seal polymers may include their high clarity, melt strength, and solid-state toughness. Ionomer resins are generally commercially available as either a sodium or a zinc ionomer and are available in a wide variety of grades. Amine salts of the copolymers may also be included, as are the acid form, partially neutralized acid form, and metal salts of the acid copolymers. Although all grades of ionomer resins may exhibit properties desirable for penetration resistant insulating glazing unit as described herein when compared to other thermoplastic polymers, sodium ionomers may provide exceptional toughness, while zinc ionomers may possess excellent chemical resistance.

When third laminate layer 38 is implemented using an ionomer material, the entire layer may be formed of and/or contain the ionomer material or the layer may coextruded with or otherwise laminated to one or more other types of polymeric materials to provide a multi-ply laminate layer. Examples of commercially available ionomer laminate materials/layers that may be used as third laminate layer 38 include a Surlyn® material commercially available from DuPont™ and/or a SentryGlas® material, commercially available from Kuraray.

Laminate layers of any suitable thickness can be used in first laminate pane 16 and second laminate pane 18. In different examples, the laminate layers in each laminate pane may be the same thickness, or the laminate layer in one pane may have a different thickness than one other laminate layer in the same pane or a different pane. In some configurations, such as the configuration illustrated in FIG. 2, third laminate layer 38 is thicker than one or both of first laminate layer 30 and second laminate layer 32. Configuring third laminate layer 38 to be comparatively thicker may be useful to help configure second laminate pane 18 to provide the final stopping strength and/or rigidity for projectile penetrating first laminate pane 16.

In FIG. 2, first laminate layer 32 has a first laminate thickness 50, second laminate layer has a second laminate thickness 52, and third laminate layer 38 has a third laminate thickness 54. Third laminate thickness 54 may be greater than both first laminate thickness 50 and second laminate thickness 52 either alone or in combination. In some configurations, a ratio of third laminate thickness 54 divided by first laminate thickness 50 and a ratio of third laminate thickness 54 divided by second laminate thickness 52 each range from 1.1 to 10, such as from 1.2 to 5. First laminate thickness 50 may be the same as or different than second laminate thickness 52. For instance, in one example, first laminate thickness 50 is the same as second laminate thickness 52.

Independent of the relative thicknesses of the laminate layers, the absolute thicknesses of each laminate layer in first laminate pane 16 and second laminate pane 18 may vary. In some implementations first laminate thickness 50 and second laminate thickness 52 are each less than 2 mm whereas third laminate thickness 54 may be greater than 2 mm. For instance, first laminate thickness 50 and second laminate thickness 52 may range from 0.2 mm to 2 mm, such as from 0.6 mm to 2 mm, or from 0.7 mm to 1.6 mm. Third laminate thickness 54 may range from 1.5 mm to 4 mm, such as from 2 mm to 3 mm, or from 2 mm to 5 mm. In some examples, the combined thickness of first laminate thickness 50 and second laminate thickness 52 is greater than or equal to third laminate thickness 54. That being said, third laminate thickness 54 may be greater than the combined thickness of first laminate layer 30 and second laminate layer 32 in other configurations.

As noted above, insulating glazing unit 10 in FIG. 2 includes spacer 20 defining between-pane space 22 separating first laminate pane 16 from second laminate pane 18. Spacer 22 may extend around the entire perimeter of insulating glazing unit 10 to hermetically seal the between-pane space 22 from gas exchange with a surrounding environment. To minimize thermal exchange across insulating glazing unit 10, between-pane space 22 can be filled with an insulative gas or even evacuated of gas. For example, between-pane space 22 may be filled with an insulative gas such as argon, krypton, or xenon. In such applications, the insulative gas may be mixed with dry air to provide a desired ratio of air to insulative gas, such as 10 percent air and 90 percent insulative gas. In other examples, between-pane space 22 may be evacuated so that the between-pane space is at vacuum pressure relative to the pressure of an environment surrounding insulating glazing at 10.

Spacer 22 can be any structure that holds opposed substrates in a spaced apart relationship over the service life of insulating glazing unit 10 and seals between-pane space 22 between the opposed panes of material, e.g., so as to inhibit or eliminate gas exchange between the between-pane space and an environment surrounding the unit. One example of a spacer that can be used as spacer 22 is a tubular spacer positioned between first laminate pane 16 and second laminate pane 18. The tubular spacer may define a hollow lumen or tube which, in some examples, is filled with desiccant. The tubular spacer may have a first side surface adhered (by a first bead of sealant) to the surface of first laminate pane 16 and a second side surface adhered (by a second bead of sealant) to surface of second laminate pane 18. A top surface of the tubular spacer can exposed to between-pane space 22 and, in some examples, includes openings that allow gas within the between-pane space to communicate with desiccating material inside of the spacer. Such a spacer can be fabricated from aluminum, stainless steel, a thermoplastic, or any other suitable material. Example advantageous glazing spacers are available commercially from Allmetal, Inc. of Itasca, Ill., U.S.A. Additional details on example tubular spacers are described in U.S. Pat. No. 8,789,343, granted Jul. 29, 2014, the entire contents of which are incorporated herein by reference.

Another example of a spacer that can be used as spacer 20 is a spacer formed from a corrugated metal reinforcing sheet surrounded by a sealant composition. The corrugated metal reinforcing sheet may be a rigid structural component that holds first laminate pane 16 apart from second laminate pane 18. Such a spacer is often referred to in commercial settings as a swiggle spacer. As yet another example, spacer 22 may be formed from a foam material surrounded on all sides except a side facing between-pane space 22 with a metal foil. Such a spacer is commercially available from Edgetech under the trade name Super Spacer®. As another example, spacer 22 may be a thermoplastic spacer (TPS) spacer formed by positioning a primary sealant (e.g., adhesive) between first laminate pane 16 and second laminate pane 18 followed, optionally, by a secondary sealant applied around the perimeter defined between the substrates and the primary sealant. Spacer 22 can have other configurations, as will be appreciated by those of ordinary skill in the art.

The distance separating first laminate pane 16 from second laminate pane 18 to define between-pane space 22 may vary, e.g., depending on the configuration of thermal performance desired of insulating glazing unit 10. As examples, the distance between first laminate pane 16 and second laminate pane 18 defined by spacer 20 may range from 2 mm to 7 mm such as, e.g., from 2 mm to 6 mm, or from approximately 3 mm to approximately 4 mm.

Depending on application, first laminate pane 16 and/or second laminate pane 18 may be coated with one or more functional coatings to modify the performance of the panes. Example functional coatings include, but are not limited to, low emissivity coatings and photocatalytic coatings. In general, a low emissivity coating is a coating that is designed to allow near infrared and visible light to pass through a pane while substantially preventing medium infrared and far infrared radiation from passing through the panes. A low emissivity coating may include one or more layers of infrared-reflection film interposed between two or more layers of transparent dielectric film. The infrared-reflection film may include (or, in other examples, consist or consist essentially of) a conductive metal like silver, gold, or copper. A photocatalytic coating, by contrast, may be a coating that includes a photocatalyst, such as titanium dioxide. In use, the photocatalyst may exhibit photoactivity that can help self-clean the panes after installation.

In general, the surfaces of insulating glazing unit 10 are numbered sequentially starting with a surface of the pane that is facing an external (e.g., outside environment). When insulating glazing unit 10 in the example of FIG. 2 is positioned so that the first laminate pane 16 faces an exterior environment and second laminate pane 18 faces an interior environment, the surface of the first laminate pane 16 facing the exterior environment may be designated the #1 surface while the opposite surface of the pane facing between-pane space 22 may be designated the #2 surface. Continuing with this example, the surface of second laminate pane 18 facing the between-pane space 22 may be designated the #3 surface while the opposite surface of the pane facing the interior environment may be designated the #4 surface.

When a low emissivity coating is used, the low emissivity coating may be positioned on any surface of any pane of insulating glazing unit 10, including on multiple surfaces of the same or different transparent panes of the insulating glazing unit. In instances when insulating glazing unit 10 includes a single low emissivity coating, for example, the coating may be positioned on the #2 or #3 surface of insulating glass unit 10. In examples in which insulating glass unit 10 includes two surfaces coated with a low emissivity coating, the low emissivity coatings may be positioned on the #2 and #3 surfaces, for example. When a photocatalytic coating is used, the photocatalytic coating is typically positioned on the #1 surface of insulating glazing unit 10.

While insulating glazing unit 10 may include various layers and functional coatings, in some configurations, the unit designed to be devoid of various layers and/or coatings found on traditional bullet proof panes. For example, traditional safety glass may include one or more polymeric anti-spall layers intended to prevent the glass from spalling and releasing glass shards in the event of a strike. The one or more anti-spall layers may be positioned on the innermost surface of the glass opposite the direction of the expected strike (e.g., the innermost surface of second laminate pane 18 opposite the surface facing between-pane space 22). The anti-spall layer may be a polymeric film, such as PVB, bonded to the innermost surface of the glass to capture and/or retain glass broken from the structure during a strike event.

While insulating glazing unit 10 may include a polymeric anti-spall layer (e.g., bonded to second laminate pane 18), in other configurations, insulating glazing unit 10 is designed to be devoid of any anti-spall layers. For example, both the outer surface of first laminate pane 16 and the inner surface of second laminate pane 18 may be devoid of any polymeric anti-spall layers. The inclusion of a polymeric anti-spall layer may have the tendency to change the visible transmittance through insulating glazing unit 10 and, correspondingly, the visual appearance of the unit to an observer. This may make the unit less desirable for designers looking to incorporate passive safety and security solutions into a structure without having the safety solutions readily identifiable by facility users. Even in instances where insulating glazing unit 10 is structured without an anti-spall layer, the unit may still provide life-saving protection against projectile strikes even if an individual exposed to glass spall during a strike event. For example, the unit may stop projectiles from breaching (penetrating) both panes of the structure, protecting an individual on an opposite side of the unit from the projectile strike, even if the individual is contacted with residual glass spall from the strike.

Insulating glazing unit 10 according to the disclosure can be used in any desired application, including as a door, a window, a skylight, or an interior partition in a residential or commercial building. Depending on the application, a frame and/or sash may be positioned around insulating glazing unit 10 to facilitate installation of the unit.

The structure of insulating glazing unit 10 according to the disclosure may protect against strikes from a wide variety of projectiles, including bullets, ground debris accelerated during a such as a hurricane, bird strikes, golf balls, baseballs, and other types of striking objects. Thus, while the unit is generally described herein as a bullet-resistant insulated glazing structure, it should be appreciated that the unit can be used for and protect against other types of contact forces, and the disclosure is not limited in this respect.

The following examples may provide additional details about insulating glass units and spacer systems in accordance with this disclosure.

EXAMPLES

A series of tests were performed to develop and evaluate the effectiveness of various insulating glazing unit configurations to stop bullets of a caliber commonly carried in handgun ammunition. The tests were performed with the objective of capturing one or multiple bullets in the between-pane space of the insulating glazing unit, which protects individual(s) inside of the structure from direct fire as well as others in the surrounding area from ricochets.

In the course of development, a test was performed to evaluate the effectiveness of different structures to defeat rounds of 9 mm, 9 mm +P, .380 ACP, .40 S&W and .45 ACP fired from at handgun at a distance of 25 feet and a 15 degree angle. The test involved four combinations of different panes, with the results refining into two lead options based on observed performance. In particular, the two designs observed during testing to exhibit lead performance characteristics were as follows:

Design 1: First laminate pane was formed of 2.2 mm float glass/0.03" PVB/4.7 mm float glass/0.03" PVB/2.2 mm float glass. Second laminate pane was formed of 2.2 mm float glass/0.9" SentryGlas®/2.2 mm float glass. In the example, 10.6 PVB and 6.9 SentryGlas® were used to construct the sample. The sample exhibited the following projectile strike results:

9 mm-0/2 pass through
9 mm +P-0/2 pass through
.380 ACP-0/2 pass through
.40 S&W-0/2 pass through (fragments)
.45 ACP-0/2 pass through (fragments)

Design 2: First laminate pane was formed of 4.7 mm float glass/0.045" PVB/2.2 mm float glass. Second laminate pane was formed of 3.0 mm float glass/0.12" SentryGlas®/3.0 mm float glass. In the example, 8.1 PVB and 10.2 SentryGlas® were used to construct the sample. The sample exhibited the following projectile strike results:

9 mm-0/2 pass through
9 mm +P-0/2 pass through
.380 ACP-0/2 pass through
.40 S&W-0/2 pass through
.45 ACP-0/2 pass through The good performance of the units was believed to come from the combination of a comparatively thick first laminate pane with flexible laminate material to dramatically decrease velocity and absorb energy followed by a comparatively thinner second laminate pane with rigid laminate material to "catch" the bullet. All test bullets were collected in between the two laminate panes in the course of testing.

Additional testing was performed using designs 1 and 2 as outlined above. The first and second laminate panes for each design were joined with a 11.5 mm spacer to form an insulating glazing unit. Impact testing was then performed using the following caliber ammunition: .380 ACP, 9 mm, .40 S&W and .45 ACP. All test shots were fired from a distance of 25' and at a 15 degree angle. Two test shots from each caliber were fired at designated quadrants of each insulating glazing unit. All 8 rounds fired at each build were captured within the between-pane space of the insulating glazing unit. Specific performance results are as follows:

Test IGU 1: Design 1
9 mm-0/2 pass through
.380 ACP-0/2 pass through
.40 S&W-0/2 pass through
.45 ACP-0/2 pass through Test IGU 2: Design 2
9 mm-0/2 pass through
.380 ACP-0/2 pass through
.40 S&W-0/2 pass through
.45 ACP-0/2 pass through Next, a Test IGU of design 1 was built and tested with 2 rounds of .40 S&W and 2 rounds of .45 ACP, fired under the conditions described above. There were no penetrations through the IGU with either .40 S&W or .45 ACP. Next, the angle was increased to evaluate potential deflection and damage to the spacer. The IGU was shot three times with 9 mm with no damage to the spacer or window frame and no penetrations through the unit. Last, the unit was shot with twelve rounds consecutively with 9 mm (3 rows of 4) with no rounds penetrating the unit. Similar tests were performed on a Test IGU of design 2, resulting in the following performance results:

9 mm-0/15 pass through
.40 S&W-0/2 pass through
.45 ACP-0/2 pass through

Additional IGU units were tested using 10 rounds each of .40 S&W and .45 ACP, fired under conditions as specified above. The IGU of design 1 resulted in 2 rounds of .40 S&W penetrating through the unit and no rounds penetrating of .45 ACP. The IGU of design 1 resulted in 1 round of .40 S&W penetrating through the unit and 1 round of .45 ACP penetrating through the unit. In the tests, the gap between bullets was less than 1 inch where the rounds were able to penetrate both laminated units, suggesting the penetration was due to the multiplicity of rounds fired at the unit.

The invention claimed is:

1. A bullet-resistant insulated glazing structure comprising:
   (a) a first laminate pane comprising:
      (i) a first rigid substrate,
      (ii) a second rigid substrate,
      (iii) a third rigid substrate,
      (iv) a first laminate layer bonding the first rigid substrate to the second rigid substrate, and
      (v) a second laminate layer bonding the second rigid substrate to the third rigid substrate;
   (b) a second laminate pane comprising:
      (i) a fourth rigid substrate,
      (ii) a fifth rigid substrate,
      (iii) a third laminate layer bonding the fourth rigid substrate to the fifth rigid substrate; and
   (c) a spacer positioned between the first pane of transparent material and the second pane of transparent material to define a between-pane space, the spacer sealing the between-pane space from gas exchange with a surrounding environment and holding the first laminate pane a separation distance from the second laminate pane;
   wherein the first laminate layer and the second laminate layer comprise a first laminate material and the third laminate layer comprises a second laminate material different than the first laminate material; and
   at least one of the first rigid substrate, the second rigid substrate, and the third rigid substrate has a thickness that is greater than at least one other of first rigid substrate, the second rigid substrate, and the third rigid substrate.

2. The structure of claim 1, wherein the second laminate material is stiffer than the first laminate material.

3. The structure of claim 2, wherein the first laminate material exhibits a shear modulus according to ASTM D4065 at 20 degrees Celsius and at a testing duration time of 1 minute of less than 10 MPa, and the second laminate material exhibits a shear modulus according to ASTM D4065 at 20 degrees Celsius and at a testing duration time of 1 minute of greater than 150.

4. The structure of claim 1, wherein the second laminate material comprises an ionomer material.

5. The structure of claim 4, wherein the ionomer material comprises an ionically cross-linked copolymer prepared from a group consisting of ethylene monomer, alpha-olefin monomer, carboxylic acid monomer, and combinations thereof.

6. The structure of claim 5, wherein the ionomer material is a sodium or zinc salt.

7. The structure of claim 1, wherein the first laminate material comprises a polyvinyl butyral.

8. The structure of claim 1, wherein the first rigid substrate exhibits a first thickness, the second rigid substrate exhibits a second thickness, and the third rigid substrate exhibits a third thickness, and the second thickness is greater than the first thickness and the third thickness.

9. The structure of claim 8, wherein the second thickness is at least two times greater than the first thickness and the third thickness.

10. The structure of claim 8, wherein the first thickness is the same as the third thickness.

11. The structure of claim 8, wherein the fourth rigid substrate exhibits a fourth thickness and the fifth rigid substrate exhibits a fifth thickness, and the first thickness, the second thickness, the fourth thickness, and the fifth thickness are each a same thickness.

12. The structure of claim 8, wherein the first thickness and the third thickness each range from 2 mm to 3 mm, and the second thickness is greater than 4 mm.

13. The structure of claim 1, wherein the first laminate layer exhibits a first laminate thickness, the second laminate layer exhibits a second laminate thickness, and the third laminate layer exhibits a third laminate thickness, and the third laminate thickness is greater than the first laminate thickness and the second laminate thickness.

14. The structure of claim 13, wherein the first laminate thickness and the second laminate thickness are each a same thickness.

15. The structure of claim 13, wherein a ratio of the third laminate thickness divided by the first laminate thickness and a ratio of the third laminate thickness divided by the second laminate thickness each range from 1.2 to 5.

16. The structure of claim 13, wherein the first laminate thickness and the second laminate thickness range from 0.6 mm to 2 mm, and the third laminate thickness is greater than 2 mm.

17. The structure of claim 1, wherein first rigid substrate, the second rigid substrate, the third rigid substrate, the fourth rigid substrate, and the fifth rigid substrate each comprise float glass.

18. The structure of claim 17, wherein the float glass is annealed.

19. The structure of claim 17, wherein the float glass is tempered.

20. The structure of claim 1, wherein the first rigid substrate and the fifth rigid substrate define opposite sides of the bullet-resistant insulated glazing structure, and the first rigid substrate and the fifth rigid substrate are each devoid of a polymeric anti-spall layer.

21. The structure of claim 1, further comprising a low emissivity coating on at least one of a surface of the first rigid substrate facing an exterior environment, a surface of the third rigid substrate facing the between-pane space, and a surface of the fourth rigid substrate facing the between-pane space.

22. The structure of claim 1, wherein the spacer comprises a tubular spacer.

23. The structure of claim 1, wherein the separation distance defined by the spacer ranges from 5 mm to 20 mm and the between-pane space is filled with an insulating gas selected from the group consisting of argon, krypton, xenon, and combinations thereof.

24. The structure of claim 1, wherein bullet-resistant insulated glazing structure is mounting in a frame with the first rigid substrate facing an exterior environment exposed to environmental elements and the fifth rigid substrate facing an interior environment of a building.

25. The structure of claim 1, wherein:
the first laminate material is polyvinyl butryal;
the second laminate material comprises an ionomer material;
the first rigid substrate exhibits a first thickness, the second rigid substrate exhibits a second thickness, and the third rigid substrate exhibits a third thickness, and the second thickness is greater than the first thickness and the second thickness; and
the first laminate layer exhibits a first laminate thickness, the second laminate layer exhibits a second laminate thickness, and the third laminate layer exhibits a third laminate thickness, and the third laminate thickness is greater than the first laminate thickness and the second laminate thickness.

26. The structure of claim 25, wherein the first, second, third, fourth, and fifth rigid substrate each comprise glass that is either annealed or tempered.

27. The structure of claim 25, wherein:
the first thickness and the third thickness each range from 2 mm to 3 mm, and the second thickness is greater than 4 mm;
the first laminate thickness and the second laminate thickness range from 0.6 mm to 2 mm, and the third laminate thickness is greater than 2 mm.

\* \* \* \* \*